(12) United States Patent
Hwang

(10) Patent No.: US 6,929,255 B2
(45) Date of Patent: Aug. 16, 2005

(54) TWO-STAGE ACTUATION CLAMP FOR ELECTRICAL DEVICE UNDER TEST (DUT) WITH DUT-LINKED DOUBLE ACTION

(75) Inventor: David Hwang, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 101 days.

(21) Appl. No.: 10/602,133

(22) Filed: Jun. 24, 2003

(65) Prior Publication Data

US 2004/0261248 A1 Dec. 30, 2004

(51) Int. Cl.⁷ .................................................. B25B 1/18
(52) U.S. Cl. ........................................ 269/24; 269/25
(58) Field of Search ........................... 269/309, 25, 71, 269/47, 50, 51, 24

(56) References Cited

U.S. PATENT DOCUMENTS

| 5,662,316 A | * | 9/1997 | Schaldach ..................... 269/25 |
| 6,336,276 B1 | * | 1/2002 | Krajec et al. ................. 33/645 |
| 6,513,260 B2 | * | 2/2003 | Krajec et al. ................. 33/645 |

\* cited by examiner

*Primary Examiner*—Robert C. Watson

(57) ABSTRACT

A novel two-stage clamp used in testing a device-under-test (DUT) is herein presented. The two-stage clamp provides two sequential actuations via one linear force, and includes clamps moving in multiple different directions. The two-stage clamp uniquely uses the DUT being clamped to provide the linkage and timing for the two-stage actuation of clamps moving in three different directions.

11 Claims, 3 Drawing Sheets

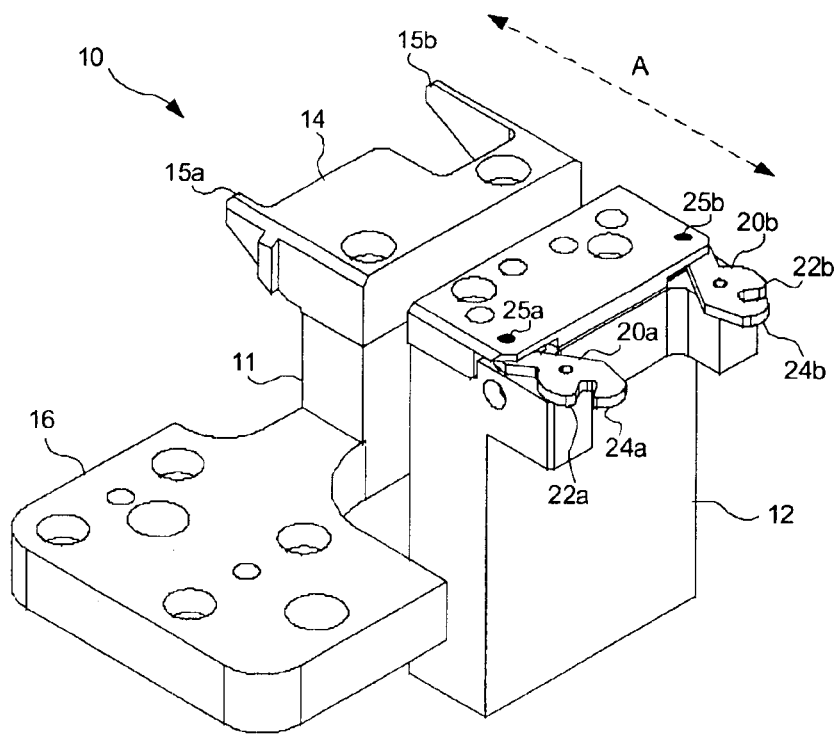
FIG. 1
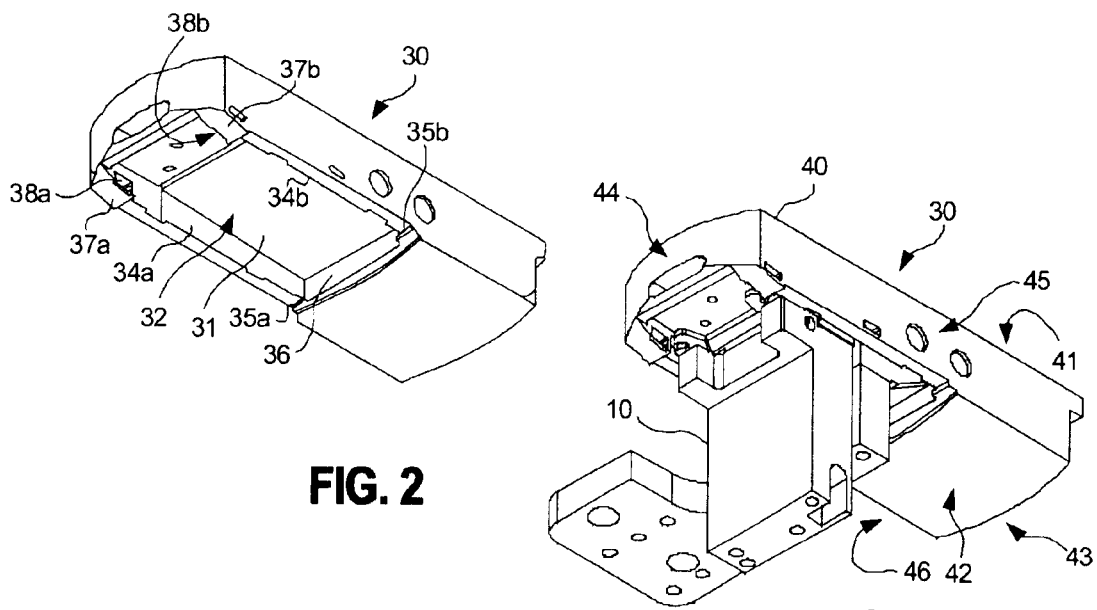
FIG. 2
FIG. 3

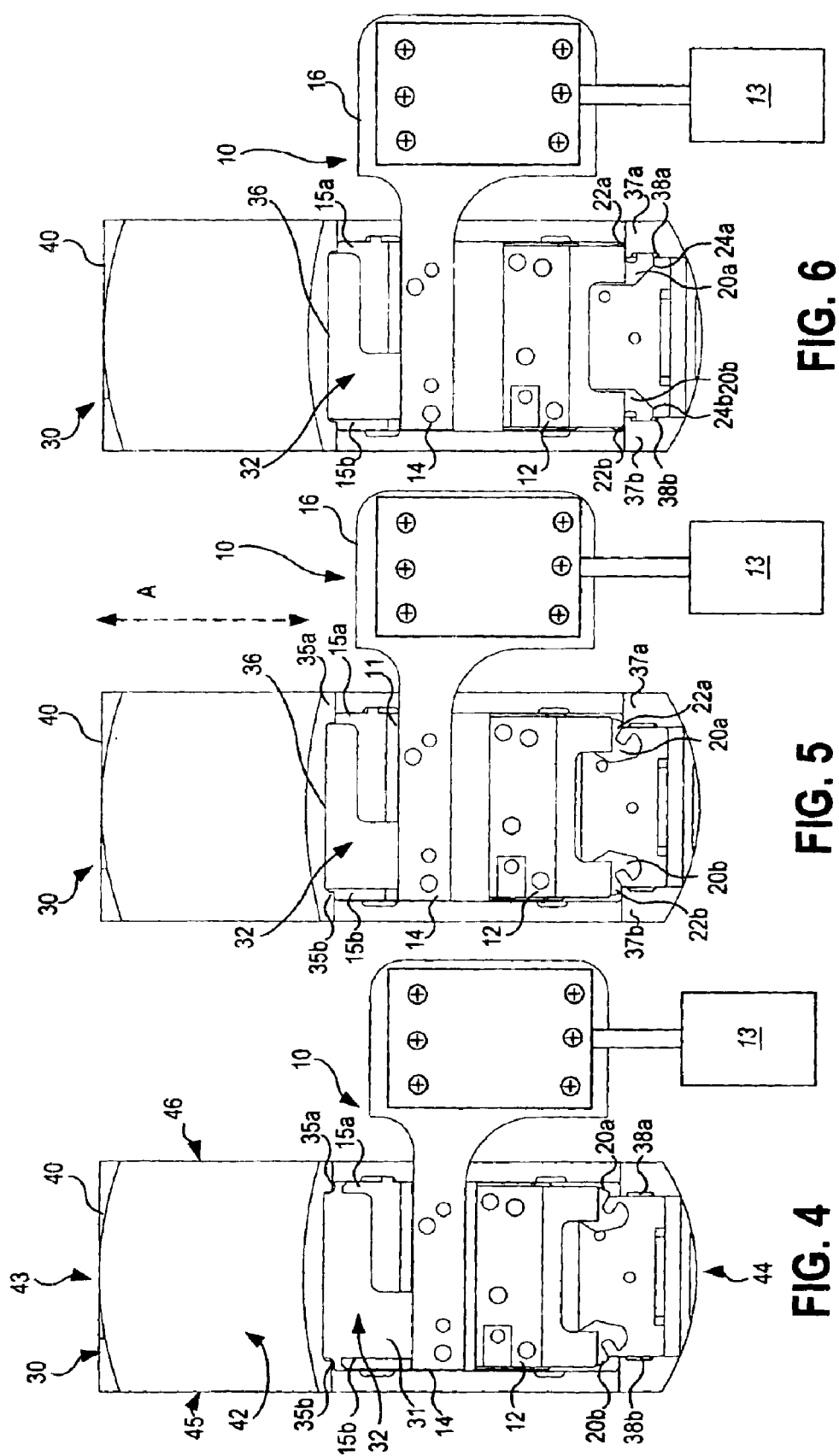

TWO-STAGE ACTUATION CLAMP FOR ELECTRICAL DEVICE UNDER TEST (DUT) WITH DUT-LINKED DOUBLE ACTION

BACKGROUND OF THE INVENTION

The present invention relates generally to electrical device testing, and more particularly to a two-stage device-under-test (DUT) clamp with DUT-linked double action for testing an electrical device.

Final level test of electrical devices often involves insertion probing of one or more receptacles, pressing buttons, and/or activating switches on the device. For example, a cellular phone often includes a receptacle configured as an array of signal points on the device under test (hereinafter referred to as the "system connector"), an audio receptacle into which a headset audio plug is inserted or a charger receptacle into which an A/C charger plug is inserted to charge up the device, and a numeric keypad comprising a set of buttons used for dialing. During final level test, the functionality of each of these features of the phone must be tested prior to shipping.

Accordingly, various tests are performed on the device (hereinafter referred to as "device under test" or "DUT"). Typically at least one or more tests require insertion probing of one or more of the DUT receptacles. Insertion probing involves the insertion of a probe into a mating DUT receptacle such that the probe and DUT receptacle make electrical contact. The electrical contact is the means through which the probe stimulates and/or receives measurement signals from the DUT. In addition, automated button pressing is required to test the operation of the keypad. Typical final level testing of electronic devices is performed in an automated environment, often using robotic actuators.

In order to accurately test a DUT in such an automated environment, several conditions must be met. First, accurate location of the DUT relative the testing probes is required for proper probing and button location. Second, the fixture that holds the DUT must firmly lock the DUT into position in order to ensure accurate probing/button-pressing force, to prevent cosmetic damage to the DUT, and to prevent the DUT from moving around during test resulting in electrical and RF signal loss and falsely failing tests.

In order to meet these requirements, the DUT is typically clamped into a known position relative the robotic tester.

Some prior art clamping solutions attempt to clamp the DUT against a fixture from the top of the DUT. However, oftentimes this configuration is not available as a clamping option due to risk of cosmetic damage to the DUT being clamped.

DUT clamps that clamp from below the DUT typically require the clamp walls to be parallel and opposing each other, and that the linear motion of the clamp be perpendicular to the wall planes. This configuration may not be feasible with certain DUT designs.

In addition, some prior art clamping solutions often use separate actuators for performing individual clamping motions. However, more actuators add complexity, cost, and tester space.

Finally, some prior art clamping solutions use custom-made link parts, adding complexity to the design.

Accordingly, although the idea of clamping a DUT is itself conceptually straightforward, the design of a clamping mechanism that is used for the purpose of fixing a DUT in place for insertion probing and button-pressing testing requires several important considerations. First, the DUT must be accurately located within the clamp to allow small probe points (e.g., the pins of a system connector) to be accurately probed. Second, clamping should be performed without risk of cosmetic damage to the DUT. Finally, the clamp should be designed with minimal complexity, cost, and space.

SUMMARY OF THE INVENTION

The present invention is a two-stage device-under-test (DUT) clamp with DUT-linked action. The preferred embodiment of the invention uniquely provides a two-stage clamp that provides two sequential actuations via one linear force, with clamps moving in multiple different directions. The clamp of the invention uniquely uses the DUT being clamped to provide the linkage and timing for the two-stage actuation of clamps moving in three different directions.

The present invention addresses three common problems when designing a clamp for such a DUT. This assembly is able to clamp a DUT with limited clamping features in the battery grave. Additionally, this assembly can clamp a DUT with clamping features on non-parallel faces of the DUT, and faces non-perpendicular to the linear actuation motion. The assembly also uses less space than conventional multiple direction clamping mechanisms as well as multiple actuation clamping mechanisms.

In an illustrative embodiment of the invention, the DUT is a wireless phone that is charged in a battery grave. The assembly locates and clamps the DUT from within the battery grave. Using the battery grave increases DUT location accuracy and at the same time minimizes the risk of cosmetic damage to the DUT case.

The clamp design of the invention requires only one linear actuator, which, using the DUT as part of the linkage, actuates three different clamping motions in three different directions. The multiple clamping forces lock the DUT firmly in place for probing and button pushing in all directions without risk of any movement of the DUT.

The invention is ideal for use in a test fixture during final level device test in which the DUT requires some insertion probing of a receptacle and/or button-pushing or switch activation.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is an isometric view of a clamping assembly implemented in accordance with the invention;

FIG. 2 is a rear isometric view of an example cellular phone DUT;

FIG. 3 is a rear isometric view of the clamping assembly of FIG. 1 and a DUT positioned over the clamping assembly, with the clamp disengaged;

FIG. 4 is a rear view of the clamping assembly of FIG. 1 and a DUT positioned over the clamping assembly with the clamp disengaged;

FIG. 5 is a rear view of the clamping assembly of FIG. 1 and a DUT positioned over the clamping assembly with the first actuation stage completed wherein the front clamp is engaged and the rear clamp is disengaged;

FIG. 6 is a rear view of the clamping assembly of FIG. 1 and a DUT positioned over the clamping assembly with both actuation stages completed wherein both the front clamp and rear clamp are engaged.

DETAILED DESCRIPTION

Figure 7:
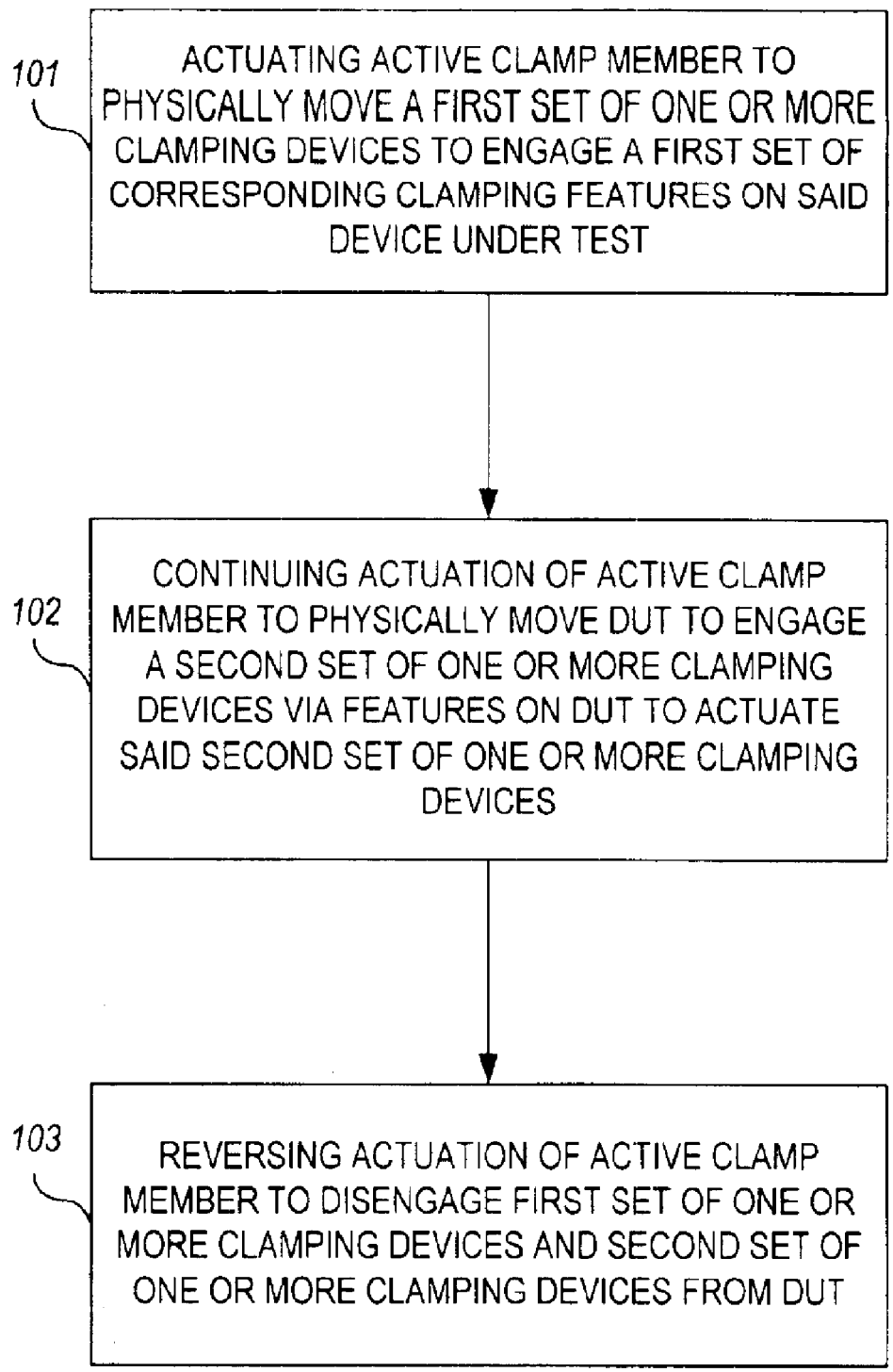
FIG. 7 is a flowchart of a method for clamping a DUT.

Turning now to the drawings, FIG. 1 illustrates a preferred embodiment of a two-stage device-under-test (DUT) clamp assembly 10 with DUT-linked double action for testing an electrical device 30, hereinafter device under test (DUT). As illustrated, the clamp assembly 10 includes a datum tower 12, an active clamp 14, and two rotating clamps 22a, 22b. The datum tower 12 is stationary, and the active clamp 14 moves in a linear motion relative the datum tower 12 as indicated by arrow A. The rotating clamps 22a, 22b rotate in opposite directions through a plane parallel to the plane defined by the linear motion (indicated by arrow A) of the active clamp 14. In the preferred embodiment, the rotating clamps 22a, 22b rotate 30° around respective clamp pivots 25a, 25b, implemented with a pin as shown. Each of the datum tower 12, active clamp 14, and rotating clamps 22a, 22b are positioned within the DUT battery grave 32 when the DUT 30 is loaded on the clamp assembly 10.

FIG. 2 shows a rear isometric view of an example DUT 30, in this example a cellular phone. The DUT 30 itself is encased in a DUT case 40. As used herein, the front 41 of the DUT case 40 is considered the face of the cellular phone on which the keypad (not shown) is accessible, the rear 42 of the DUT case 40 is considered the side of the cellular phone where the battery grave 32 is accessible, the top 43 of the DUT case 40 is considered the face of the cellular phone located at the top of the case when the numbers/letters on the keypad are upright, the bottom 44 of the DUT case 40 is considered the face of the cellular phone located at the bottom of the case when the numbers/letters on the keypad are upright, the right 45 of the DUT case 40 is considered the right side face of the cellular phone when looking at the front face 41, and the left 46 of the DUT case 40 is considered the left side face of the cellular phone when looking at the front face 41.

As shown in FIG. 2, the DUT case 40 includes a battery grave 32 on the bottom rear of the DUT case 40. The battery grave 32 is formed as a sunken box within the DUT case 40, including a battery grave floor 31 parallel to the front 41 and rear 42 faces of the DUT case 40 and sunk approximately ⅜ inch below the rear face 42 of the DUT case 40, two side walls 34a, 34b parallel to the right 45 and left 46 faces of the DUT case 40, and a top wall 36 parallel to the top face 43 of the DUT case 40. During use, the purpose of the battery grave 32 is to seat one or more batteries (not shown) in electrical contact with the DUT circuitry to provide power to the DUT 30. When the batteries are seated in position, a cover (not shown) is attached over the battery grave 32 to protect the batteries and to prevent them from falling out of the DUT case 40 during use. During test, the cover is removed and the battery grave 32 is empty of batteries.

The features of the battery grave 32 that allow the cover to snap into place and remain fixed in position are used in the present invention to clamp the DUT 30 into place for DUT final level test. To this end, the DUT 30 includes a pair of flanges 35a, 35b located at the top wall 36 of the battery grave 32 that project over a portion of the battery grave 32 flush with the rear face 42 of the DUT case 40. The DUT case 40 also includes a pair of slots 38a, 38b, one each located at the bottom of the respective side walls 34a, 34b of the battery grave 32.

Turning now to the clamp assembly 10, shown in FIG. 1, the active clamp 14 includes a block 11 that supports a pair of tabs 15a, 15b located at the end (hereinafter "clamping end") of the block 11 that are designed to be inserted into the battery grave 32 of the DUT case 40. These tabs 15a, 15b are designed to slide beneath the pair of flanges 35a, 35b at the top wall 36 of the DUT battery grave 32 when the active clamp 14 is actuated.

The datum tower 12 is a stationary block that supports a pair of rotating clamps 20a, 20b that are designed to fit within the respective slots 38a, 38b on the side walls 34a, 34b of the battery grave 32 when rotated into final engagement position, as discussed hereinafter.

Operation of the clamp assembly 10 is now described in conjunction with FIGS. 3, 4, 5, and 6. In operation, the DUT 30 encased in DUT case 40 is loaded over the clamping end of both the datum tower 12 and active clamp 14 such that the clamping end of the clamp assembly 10 is positioned within the battery grave 32 of the DUT case 40, as shown in FIGS. 3 and 4. FIG. 3 is an isometric view of the positioning of the DUT case 40 over the clamp assembly 10 prior to engagement of the clamps. FIG. 4 shows the rear,view of the DUT case 40 with the clamp assembly 10 in position for engagement but as yet disengaged. As shown in FIGS. 3 and 4, in preparation for engagement of the clamp assembly 10 with the DUT 30, active clamp tabs 15a, 15b are positioned in proximity to and facing the respective battery grave top wall flanges 35a, 35b of the DUT case 40, and rotating clamps 20a, 20b are positioned in proximity to but not inserted in the respective side wall slots 38a, 38b of the DUT case 40 near the bottom of the DUT battery grave 32. The active clamp tabs 15a, 15b and rotating clamps 20a, 20b are each positioned within the battery grave 32 such that the clamping end of the active clamp 14 and datum tower 12 abut against the floor 31 of the battery grave 32. At this point, the active clamp tabs 15a, 15b are not yet underneath the battery grave top wall flanges 35a, 35b, and the rotating clamps 20a, 20b are in their non-rotated position and therefore not inserted in the respective DUT case slots 38a, 38b.

FIG. 5 illustrates the first stage of actuation of engagement of the DUT case 40 by the clamp assembly 10. In operation, once the battery grave 32 of the DUT 30 is positioned over the clamping end of the assembly 10, as shown in FIGS. 3 and 4, a linear actuator 13 (pneumatic or otherwise, but attachable to block arm 16 which is in turn attached to block 11) then actuates the active clamp 14, moving it linearly along the path indicated by arrow A in the direction toward the top wall 36 of the battery grave 32. This causes the active clamp tabs 15a, 15b to begin moving under the battery grave top wall flanges 35a, 35b. Actuation of the active clamp 14 continues until the active clamp tabs 15a, 15b engage the battery grave top wall 36, whereupon the ends of the active clamp tabs 15a, 15b are positioned underneath the battery grave top wall flanges 35a, 35b. This action clamps the top wall 36 of the DUT case 40, as shown in FIG. 5, and the first stage of actuation in which the active clamp 14 is engaged and the rotating clamps 20a, 20b are still disengaged is complete. FIG. 7, step 101 describes the first stage of actuation.

Once the active clamp 14 is engaged, the second stage of actuation begins as described in FIG. 7, step 102. To this end, after the active clamp 14 engages the front wall 36 of the DUT battery grave 32, the actuator (not shown) continues to move the active clamp 14 forward in the same direction, thereby moving the DUT 30 forward with it. Because the datum tower 12 holding the rotating clamps 20a, 20b remains stationary, notches 37a, 37b near the bottom of the battery grave 32 engage the rotating clamp engagement members 22a, 22b of the rotating clamps 20a, 20b. As the actuator continues to move the DUT linearly along the same direction, the notches 37a, 37b continue to further engage the rotating clamps 20a, 20b, causing the rotating clamps 20a, 20b to rotate such that the rotating clamp hooks 24a, 24b respectively rotate outward towards the side walls 34a, 34b of the battery grave 32 and into the slots 38a, 38b in the side walls 34a, 34b of the DUT's battery grave 32. The actuator continues to move the DUT 30 linearly forward until the rotating clamps 20a, 20b are fully within the respective slots 38a, 38b of the battery grave 32, as illustrated in FIG. 6. At this point both stages of actuation of the clamp assembly 10 is complete, and all clamps 15a, 15b, 20a, 20b are fully engaged with the DUT case 40.

As illustrated, the DUT case 40 is clamped in three different directions (i.e., one on the top wall of the battery grave 32 and one on either of the side walls 34a, 34b of the battery grave 32) and movement of the DUT 30 in any direction is prevented.

To release the DUT 30 from the clamp assembly 10, the actuator moves (FIG. 7, step 103) the active clamp 14 in the reverse linear direction to disengage the active clamp tabs 15a, 15b from underneath the flanges 35a, 35b of the top wall 36 of the DUT battery grave 32. Springs (not shown) which bias the rotating clamps 20a, 20b to their original non-rotated position rotate the rotating clamps out of the slots 38a, 38b, and the DUT 30 may be removed from the clamp assembly 10.

It is clear from the above detailed description that the present invention offers several advantages over prior art clamping techniques. First, the clamp requires only one actuator and one actuating motion yet clamps in multiple directions, including on non-parallel faces of the DUT. Secondly, the clamp traps and clamps the DUT from the rear, using features already present in the DUT. This prevents cosmetic damage to the DUT case, and simplifies the DUT case design since additional features and design are not required for clamping. Finally, the DUT itself is used as the linkage between two clamp actuation stages.

Although this preferred embodiment of the present invention has been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A clamping assembly for clamping a device under test, comprising:
   a stationary member having one or more clamping devices each of which comprises clamp actuation means and clamping means responsive to actuation of said clamp actuation means to activate clamping action of said one or more clamping devices of said stationary member;
   an active clamp member having one or more clamping devices, said active clamp member responsive to an actuator to physically move said active clamp member relative said stationary member in order to engage said one or more clamping devices of said active clamp member with a first set of corresponding clamping features on said device under test and to physically move said device under test to cause actuation features on said device under test to engage said clamp actuation means of said one or more clamping devices on said stationary member to activate said clamping action of said one or more clamping devices on said stationary member with a second set of corresponding clamping features on said device under test.

2. A clamping assembly in accordance with claim 1, wherein:
   said active clamp member comprises one or more tabs that slide underneath corresponding flanges on said device under test when said active clamp member is actuated by said actuator.

3. A clamping assembly in accordance with claim 1, wherein:
   said stationary member comprises one or more rotating clamps, each having a clamp engagement member and a clamp hook, and each rotating said clamp hook into a respective slot in said DUT upon engagement of said clamp engagement member with a feature of said DUT as said DUT is physically moved.

4. A clamping assembly for clamping a device under test, comprising:
   a stationary member having one or more rotating clamping devices each of which comprises clamp engagement member and a clamp hook, wherein said clamp engagement member is responsive to engagement force to rotate said clamp hook to a rotated position;
   an active clamp member comprising one or more tabs, said active clamp member responsive to an actuator to physically move said active clamp member relative said stationary member in order to engage said one or more tabs with a first set of corresponding one or more receptacles on said device under test and to physically move said device under test to cause actuation features on said device under test to engage said clamp engagement members of said one or more rotating clamping devices of said stationary member to rotate said respective clamp hooks of said one or more rotating clamping devices into a second set of corresponding one or more receptacles on said device under test.

5. A clamping assembly in accordance with claim 4, wherein said first set of one or more receptacles on said device under test comprises one or more flanges and actuation of said active clamp member causes said one or more tabs to slide underneath corresponding ones of said one or more flanges.

6. A clamping assembly in accordance with claim 5, wherein said second set of one or more receptacles on said device under test comprises one or more slots for seating said respective clamp hooks of said one or more rotating clamps when said actuation features on said device under test fully engage said clamp engagement members of said one or more rotating clamping devices.

7. A clamping assembly in accordance with claim 4, wherein said second set of one or more receptacles on said device under test comprises one or more slots for seating said respective clamp hooks of said one or more rotating clamps when said actuation features on said device under test fully engage said clamp engagement members of said one or more rotating clamping devices.

8. A clamping assembly for clamping a device under test, comprising:
   a first member comprising one or more rotating clamping devices each of which comprises a first retaining member end a first engagement member that is responsive to a common engagement force to respectively rotate the retaining member through a common first plane to a respective rotated position;

a second member which moves relative to said first member along a second plane parallel to said first plane, said second member comprising one or more second engagement members, said second member responsive to actuation force to physically move said second member relative to said first member along said second plane in order to engage said one or more second engagement members with corresponding one or more first receptacles on said device under test and to cause actuation features on said device under test to engage said respective first engagement members of said respective one or more rotating clamping devices to rotate said respective retaining members of said respective one or more rotating clamping devices into corresponding one or more second receptacles on said device under test.

9. A clamping assembly in accordance with claim 8, wherein:

said one or more second engagement members comprise tabs;

said corresponding one or more first receptacles on said device under test comprises one or more flanges; and full actuation of said second member causes said one or more tabs to slide underneath corresponding ones of said one or more flanges.

10. A clamping assembly in accordance with claim 8, wherein:

said one or more first retaining members comprise one or more respective hooks;

said corresponding one or more second receptacles on said device under test comprise one or more respective slots; and full actuation of said second member causes said one or more respective hooks to rotate and hook into said one or more respective slots.

11. A clamping assembly in accordance with claim 8, wherein:

said one or more second engagement members comprise tabs;

said corresponding one or more first receptacles on said device under test comprises one or more flanges;

said one or more first retaining members comprise one or more respective hooks;

said corresponding one or more second receptacles on said device under test comprise one or more respective slots; and full actuation of said second member causes said one or more tabs to slide underneath end engage said corresponding ones of said one or more flanges and said one or more respective hooks to rotate and hook into said one or more respective slots.

* * * * *

UNITED STATES PATENT AND TRADEMARK OFFICE
CERTIFICATE OF CORRECTION

PATENT NO.    : 6,929,255 B2
DATED         : August 16, 2005
INVENTOR(S)   : Hwang It is certified that error appears in the above-identified patent and that said Letters Patent is hereby corrected as shown below:

Column 6,
Line 66, delete "end" and insert -- and --, therefor.

Column 8,
Line 24, delete "end" and insert -- and --, therefor.

Signed and Sealed this

Twenty-ninth Day of November, 2005

JON W. DUDAS
*Director of the United States Patent and Trademark Office*